United States Patent
Herzig et al.

(10) Patent No.: US 6,594,503 B1
(45) Date of Patent: Jul. 15, 2003

(54) COMMUNICATION DEVICE WITH DIAL FUNCTION USING OPTICAL CHARACTER RECOGNITION, AND METHOD

(75) Inventors: Hans-Peter Herzig, Taunusstein (DE); Volker Martschink, Wiesbaden (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/496,548

(22) Filed: Feb. 2, 2000

(51) Int. Cl.[7] .................................................. H04Q 7/32
(52) U.S. Cl. ...................... 455/550; 455/564; 455/556; 455/557; 455/66; 379/433.01; 379/428.01
(58) Field of Search .................... 455/550, 575, 455/90, 564, 563, 566, 556, 557, 344, 347, 517, 350, 351, 414, 66; 379/433.01, 428.01

(56) References Cited

U.S. PATENT DOCUMENTS

| | | | |
|---|---|---|---|
| 4,075,605 A | 2/1978 | Hilley et al. | 340/146.3 AC |
| 4,408,344 A | 10/1983 | McWaters et al. | 382/62 |
| 4,503,288 A | 3/1985 | Kessler | 179/2 DP |
| 4,654,482 A | 3/1987 | DeAngelis | 379/95 |
| 4,868,849 A | 9/1989 | Tamaoki | 379/357 |
| 4,897,865 A | 1/1990 | Canuel | 379/91 |
| 4,907,264 A | 3/1990 | Seiler et al. | 379/355 |
| 4,937,853 A | 6/1990 | Brule et al. | 379/96 |
| 5,144,654 A | 9/1992 | Kelley et al. | 379/356 |
| 5,574,804 A | 11/1996 | Olschafskie et al. | 382/313 |
| 5,778,314 A * | 7/1998 | Sudo et al. | 455/564 |
| 5,920,877 A | 7/1999 | Kolster | 707/512 |
| 5,966,669 A | 10/1999 | Kenmochi et al. | 455/557 |
| 5,971,277 A | 10/1999 | Cragun et al. | 235/462.01 |
| 6,049,604 A * | 4/2000 | Lin | 455/563 |
| 6,198,947 B1 * | 3/2001 | Barber | 455/563 |
| 6,424,843 B1 * | 7/2002 | Reitmaa et al. | 455/550 |
| 6,427,078 B1 * | 7/2002 | Wilska et al. | 455/550 |

FOREIGN PATENT DOCUMENTS

| | | | |
|---|---|---|---|
| EP | 0062777 | 10/1982 | G06K/7/10 |
| EP | 0063243 | 10/1982 | G06K/7/10 |
| JP | 9-307617 | 11/1997 | H04M/1/27 |
| WO | WO 96/33453 | 10/1996 | G06F/3/00 |

* cited by examiner

Primary Examiner—William Trost
Assistant Examiner—Keith Ferguson
(74) Attorney, Agent, or Firm—Steven R. Santema; Valerie M. Davis

(57) ABSTRACT

A communication device (200), such as a cellular mobile phone or a cordless phone, has a dial unit (208) for communication with a base station. An input device for dialing a phone number which forwards a coded dial signal (215) to the dial unit (208) is implemented as an optical character recognition (OCR) scanner (210) that reads phone numbers (202) from a printed or hand-written original (201). Optionally, especially for recognizing hand-writing, the scanner (210) sends graphical representations of input data to the base station that obtains the code dial signals by an external processor.

10 Claims, 4 Drawing Sheets

COMMUNICATION DEVICE WITH DIAL FUNCTION USING OPTICAL CHARACTER RECOGNITION, AND METHOD

FIELD OF THE INVENTION

The present invention generally relates to a communication device, and, more particularly, to a portable phone.

BACKGROUND OF THE INVENTION

A communication device is often used in a network having a plurality of nodes. When a user wants to establish a communication between the device and a node, then the user usually manually inputs a node identifier through a keyboard of the device.

For example, the device is a portable phone operating in a public or private telephone network where the nodes are further phones (e.g., cellular phones or fixed network phones). The user establishes a communication by dialing a phone number.

However, typing a number into a keyboard by a human might cause misled phone calls. A physically challenged person might not be able to use the keyboard.

Phones having a dial function that is supported by voice recognition became recently available on the market. Apart from technical problems occurring in a noisy environment, some users hesitate from speaking a phone number into the phone, for example, because they fear to disclose the number in public.

JP 9307617 teaches a portable phone where the number is dialed by a bar-code scanner; requiring that numbers have to be available in a bar-code format. U.S. Pat. No. 5,966,669 teaches a portable phone that can be connected to an external bar-code/OCR reader. Further references for OCR readers are U.S. Pat. No. 4,408,344, U.S. Pat. No. 4,075,605, U.S. Pat. No. 5,574,804, European Patent Specification EP 0063243B1, and European Patent Application EP 0062777A2.

The present invention seeks to provide a communication device which mitigate or avoid these and other disadvantages and limitations of the prior art.

DETAILED DESCRIPTION OF A PREFERRED EMBODIMENT

Figure 1:
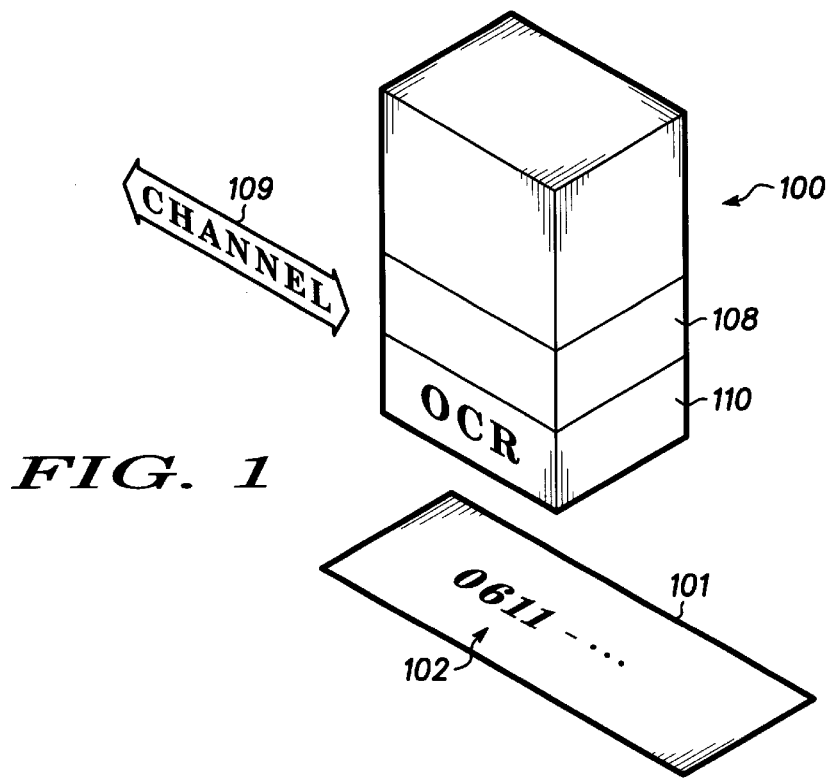
FIG. 1 illustrates a communication device with a built-in OCR reader according to the present invention.

FIG. 1 illustrates a simplified diagram of communication device 100 (hereinafter "device 100") with built-in OCR reader 110 according to the present invention. Illustrated are device 100, original 101, dial identification 102, dial unit 108, communication channel 109, and OCR reader 110.

Preferably, device 100 is a portable phone, such as a cellular phone (analog or digital, e.g., GSM, CDMA), a cordless phone (e.g., DECT). Device 100 can also be a two-way radio. Device 100 establishes communication via channel 109 (e.g., radio connection) to an above mentioned network node (e.g., base station) by dialing with dial unit 108. The term "dialing" that is often used in connection with phones is intended to include here also "selecting" that is often used in the field of two-way radios.

Device 100 is characterized by built-in optical character recognition (OCR) reader 110 to receive dial identification 102 from an original 101 (e.g., paper, computer display screen, or any other substrate). Reader 110 can comprise a charge-coupled device (CCD) or other means for reading.

Dial identification 102 can be any written identifier (by hand, typewriter, or printed). Preferably, dial identification 102 is phone number or a name of a person (or institution etc.) to be called. Device 100 can also be adapted for communication with a fax machine. For simplicity, the term "phone number" used herein is intended to refer also to fax numbers. However, this is not limited; identification 102 can also be an internet address (e.g., "http//www . . . "). When identification 102 is a name then device 100 conveniently uses a look-up table (not illustrated) to allocate a phone number for the name. In the example, used herein, dial identification 102 is given by the phone number "0611. . ." (area code for the German city of Wiesbaden); with the ellipsis standing for any further combination, but of course device 100 can read any other phone number.

In operation, device 100 reads identifier 102, performs any of the well known OCR procedures, and uses a coded representation (e.g., ASCII-code, see FIG. 2) of identification 102 to dial.

Figure 2:
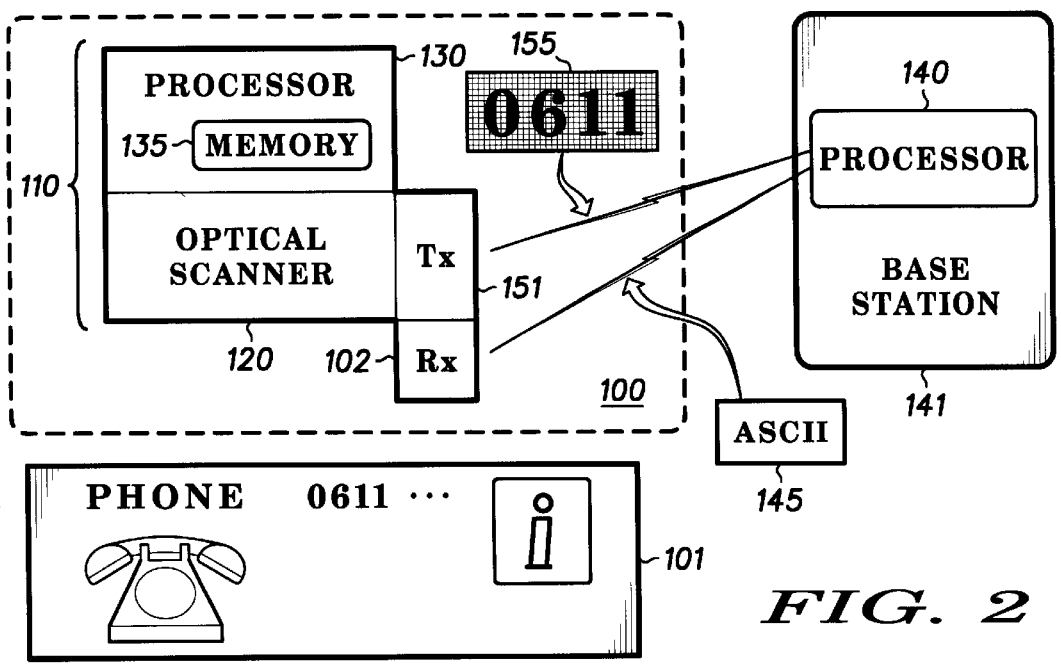
FIG. 2 illustrates the communication device of FIG. 1 with more detail as well as illustrates a phone network base station.

FIG. 2 illustrates device 100 with more detail as well as illustrates phone network base station 141. Illustrated are device 100 (dashed frame), original 101 (below), reader 110, optical scanner 120, character recognition processor 130, external character recognition processor 140, code representation 145 ("ASCII"), base station 141, transmitter 151, receiver 152, and graphical representation 155 (e.g., "0611" as pixels).

Reader 110 of device 100 preferably comprises optical scanner 120 and character recognition processor 130. Examples for OCR-readers are given, for example, in U.S. Pat. No. 5,574,804; 4,408,344; and 4,075,605.

Optionally, processor 130 can be coupled to or can comprise memory 135 for storing phone numbers (or other identification 102) that have been recognized. Preferably, character recognition processor 130 has a reduced recognition algorithm that recognizes numbers and control characters (such as hyphens and a few symbols) only, but not letters.

In a convenient embodiment, processor 130 recognizes the presence of phone number indicators 102 (and/or fax number indicators, see above) on original 101. Such indicators can be keywords (e.g., in English "PHONE", "phone", "CALL", "telephone"), phrases (e.g., "CALL 1–800", "Call me under"), or pictograms (e.g., for "phone" as illustrated; language or country code identifiers with flags, etc.).

Recognition is not limited to the Latin alphabet, languages that use non-Latin characters (e.g., Russian, Korean, Chinese, Japanese) can also be considered.

Pictograms are also useful. For example, scanning the symbol "information" (cf. illustrated in original 101 on the right) would connect the user to directory enquiries or any other operator assisted information service. Further modifications are also useful. For example, device 100 can be coupled to an information network that allows the user to scan in keywords and to get connected to an assistant. For example, of the user would read in the words "hotel" and "Wiesbaden" then a call to the Tourist Information Service Center in Wiesbaden could be established.

It is convenient to have processor 130 being part of device 100, but not essential for the present invention. Additionally to scanner 120, reader 110 can optionally comprise transmitter 151 to send graphical representation 155 (of dial identification 102) to external character recognition processor 140 and receiver 152 (of code representation 145) of dial identification from external processor 140. Preferably, transmitter 151 and receiver 152 operate through channel 109. This optional external recognition can be activated, for example, when dial identification 102 is written by hand and built-in processor 130 does not recognize the hand-writing. Preferably, external processor 140 is located in base station 141 (e.g., of a cellular phone network). In such an implementation, the network provider can charge the user for recognition ("pay per scan"). Reader 110 of device 100 can also scan further information (e.g., a picture) from original 101 to be transmitted to a further device (e.g., a fax machine, printer) without OCR. When OCR is used, then device 100 can transmit further information as a short message in a cellular phone network (so called SMS). This optional feature is useful, for example, to transmit addresses from a visiting card ("calling card", "business card", details FIG. 7).

Figure 3:
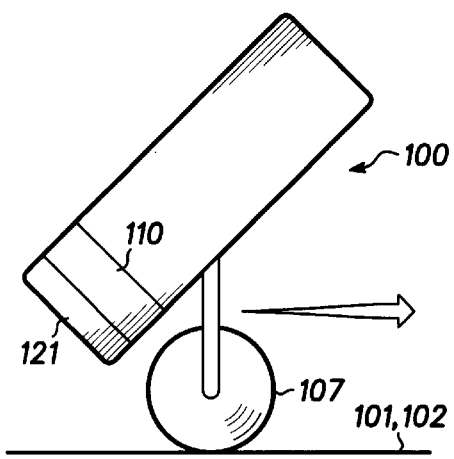
FIG. 3 illustrates the communication device of FIG. 1 having the reader implemented by a line scanner.

FIG. 3 illustrates device 100 having reader 110 implemented by line scanner 121. Illustrated are device 100, original 101, dial identification 102, reader 110 and line scanner 121 with wheel 107 (optional).

Reader 110 receives dial identification 102 by line scanner 121 when device 100 is moved over original 101 in a first direction during a predetermined reading time (e.g., a few milliseconds). For example, the user can sweep device 100 over a text showing a phone number. Optionally, reader 110 touches original 101 by wheel 107 to obtain synchronization information.

Figure 4:
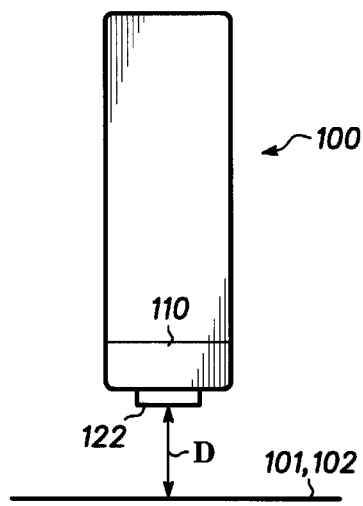
FIG. 4 illustrates the communication device of FIG. 1 having the reader implemented by an autofocus objective.

FIG. 4 illustrates device 100 having reader 110 implemented by an autofocus objective 122 projecting the picture to a CCD-matrix or other type of image sensor. Illustrated are device 100, original 101, dial identification 102, and reader 110 with autofocus objective 122.

Reader 110 collects image data of dial identification 102 by being in a predetermined distance D (e.g., 2. . . 300 milli meters) from original 101 during a predetermined data collecting time. In other words, the user holds device 100 near original 101 that is snap-shooting.

Figure 5:
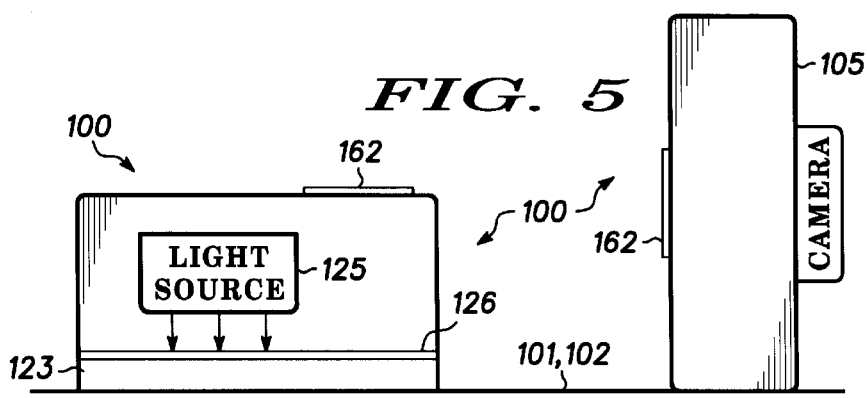
FIG. 5 illustrates the communication device of FIG. 1 having the reader implemented by a contact camera.

FIG. 5 illustrates device 100 having reader 110 implemented by contact camera 123 where distance D is substantially zero. Illustrated are device 100 having outer surface 105, original 101, dial identification 102, reader 110, contact camera 123 with active background light 125 or florescent background light 126, as well as display 162.

Reader 110 comprises contact camera 123 that receives dial identification 102 when touching original 101 during a predetermined data collecting time TC (short as in FIG. 4). Preferably, camera 123 has equal or larger dimensions than original 101. For example, for a printed 12-digit phone number (14 point letters) that is about 30 milli meters long and 3 milli meters high, camera 123 could have that dimensions.

Contact camera 123 can be provided, for example, by a CCD-matrix that has the same dimensions as identification 102. Camera 123 can also be implemented by a scanning array with row and columns of photo sensitive diodes as explained in above mentioned U.S. Pat. No. 4,408,344.

Figure 6:
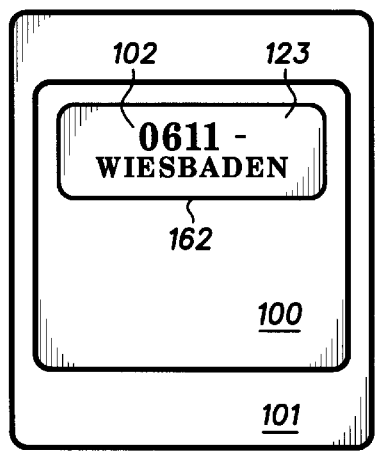
FIG. 6 illustrates the communication device of FIG. 5 with a transparent camera.
Figure 8:
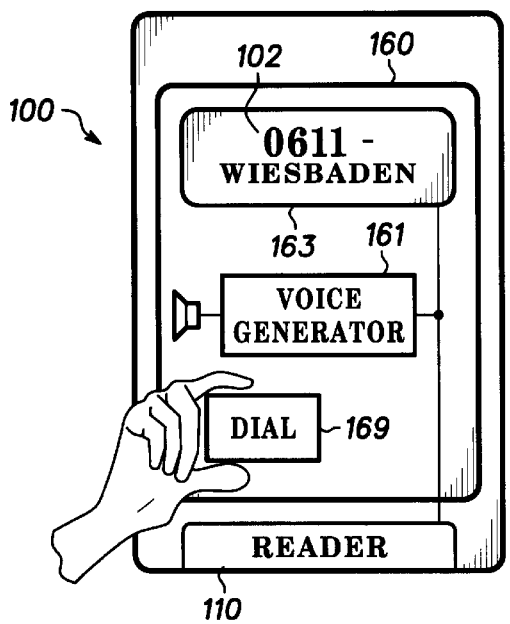
FIG. 8 illustrates the communication device of FIG. 1 with a confirmation interface.

Device 100 preferably incorporates camera 123 on an outer surface 105, preferably on its backside, opposite to display 162 (cf. FIGS. 6 and 8). The user simply puts device 100 on the original. It is an advantage of the embodiment in FIG. 5 that it is not required to move device 100.

FIG. 5 also illustrates how the light to operate camera 123 is obtained. Contact camera 123 can have active background light 125 (e.g., located inside device 100, light emitting diodes LEDs); or contact camera 123 has florescent background light 126 (e.g., layer above camera 123) that is activated before receiving dial identification 102 by exposing device 100 to environment light. A further way to obtain the light is mentioned in connection with FIG. 6.

FIG. 6 illustrates the device of FIG. 5 with a transparent camera. Illustrated are device 100, original 101, dial identification 102, contact camera 123, and LCD display 162. Contact camera 123 is based on a translucent material (e.g., glass, or polymer) to let environment light reaching original 102. If the material is also transparent, then the user has the advantage to see original 102 while operating reader 110. Further, the material that carries camera 123 can have a liquid crystal display LCD for a confirmation function (details FIG. 8).

Figure 7:
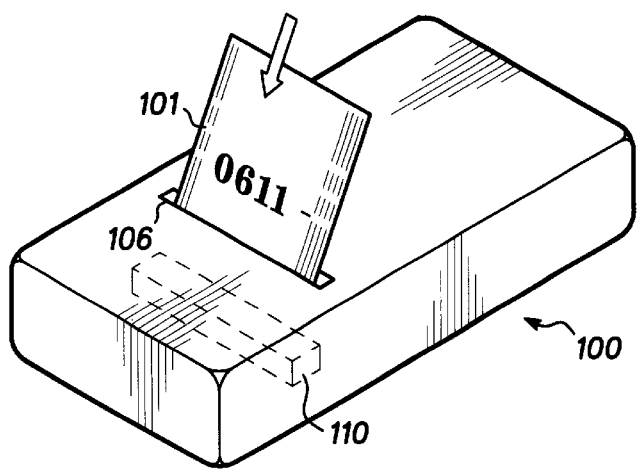
FIG. 7 illustrate the communication device of FIG. 1 having the reader implemented as a visiting card reader.

FIG. 7 illustrate device 100 having reader 110 implemented as a visiting card reader. Illustrated are device 100, original 101 (e.g., card), recess 106, and reader 110 (dashed). The user temporarily inserts original 101 into recess 106 (or pushes it through).

FIG. 8 illustrates device 100 with confirmation interface 160. Illustrated are device 100, dial identification 102, reader 110, interface 160, voice generator 161, loudspeaker 162, and display 163.

Device 100 receives a confirmation from the user via interface 160, for example, when the user presses key 169 ("DIAL"). Preferably, the user can also input a rejection (by a key or otherwise).

Confirmation interface 160 returns the recognized dial identification 102 to the user, for example through voice generator 161 and loudspeaker 162 or through display 163. Preferably, display 163 is arranged such that display 163 is visible to the user when reader 110 is operating. In the above mentioned example, where original 101 shows identification "0611", loudspeaker 162 would speak "zero-six-one-one" and/or display 163 would indicate "0611".

Optionally, interface 160 returns the recognized dial identification 102 to the user together with a redundant check information derived from dial identification. To use the example again, loudspeaker 162 would output "zero-six-one-one Wiesbaden" and/or display 163 would indicate "0611 Wiesbaden".

When in case of an recognition error, device 100 outputs "0911 Nuernberg" so that the user can easily recognize the error.

Further modifications can be implemented without departing from the scope of the present invention. For example, device 100 could memorize (cf. memory 135 in FIG. 2) frequently used area codes. In case of an infrequent recognized number, device 100 could ask the user to verify ("You really want to call to Nuernberg?").

Figure 9:
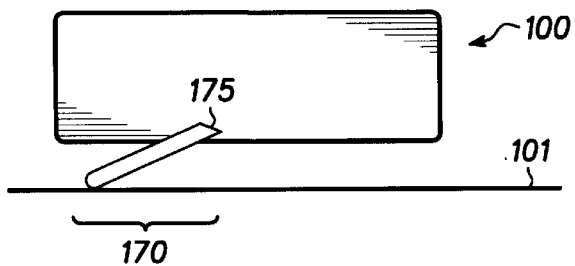
FIG. 9 illustrates the communication device of FIG. 1 with a sensor that activates the reader.

FIG. 9 illustrates device 100 with sensor 170 that activates reader 110. Illustrated are device 100, original 101, sensor 170 as mechanical switch 175.

Reader 110 is activated by sensor 170 that senses the presence of original 101. Sensor 170 can be implemented, for example, by a proximity sensor. In the example of FIG. 9, sensor 170 is implemented by mechanical switch 175.

Further modifications, to device 100 can be accomplished. For example, dial unit 108 (cf. FIG. 1) can be implemented by a loudspeaker (e.g., loudspeaker 162 in FIG. 8) to output a representation of dial identification 102 by a dual tone multi frequency (DTMF) signal. Without the need to type in a single digit into a conventional phone keyboard or to read a phone number from paper by his or her eyes, the user can set up a phone call by simply scanning a phone number and holding device 100 to the microphone of a conventional phone (channel 109). Such a "dial assistant" is convenient for users that are physically challenged.

Various further possibilities can be obtained when reader 110 is a color reader. To mention only a few advantages, the above mentioned recognition of national flags would be enhanced. For example, tricolors used in many European countries can be distinguished with higher accuracy.

Figure 10:
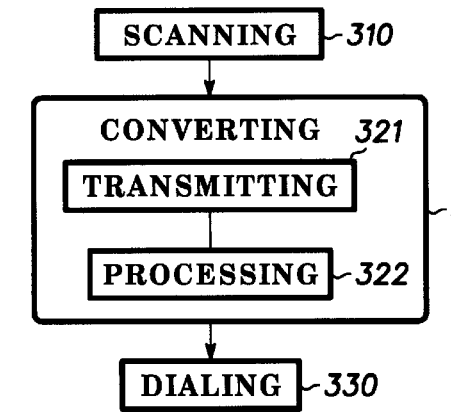
FIG. 10 illustrates a simplified method flow chart diagram of a method according to the present invention.

FIG. 10 illustrates a simplified method flow chart diagram of method 300 according to the present invention. Method 300 for communicating node identifier 102 through portable communication device 100 to a network (represented by base station 141 in FIG. 2) having a plurality of nodes (wherein identifier/phone number 102 is available on original 101) comprises the steps of scanning 310, converting 320, and dialing 330. In scanning step 310, original 101 is at least partially scanned into a memory (like memory 135) of device 100 to obtain graphical representation 155 (e.g., pixel image) of identifier 102. In converting step 320, graphical representation 155 is converted into a code representation, wherein OCR techniques are used. In dialing step 330, the code representation is send to the network.

Optionally, converting step 320 can comprise the steps transmitting 321 the graphical representation to an external processor (cf. processor 141 in FIG. 2) and processing 322 the graphical representation by the external processor to the code representation.

Figure 11:
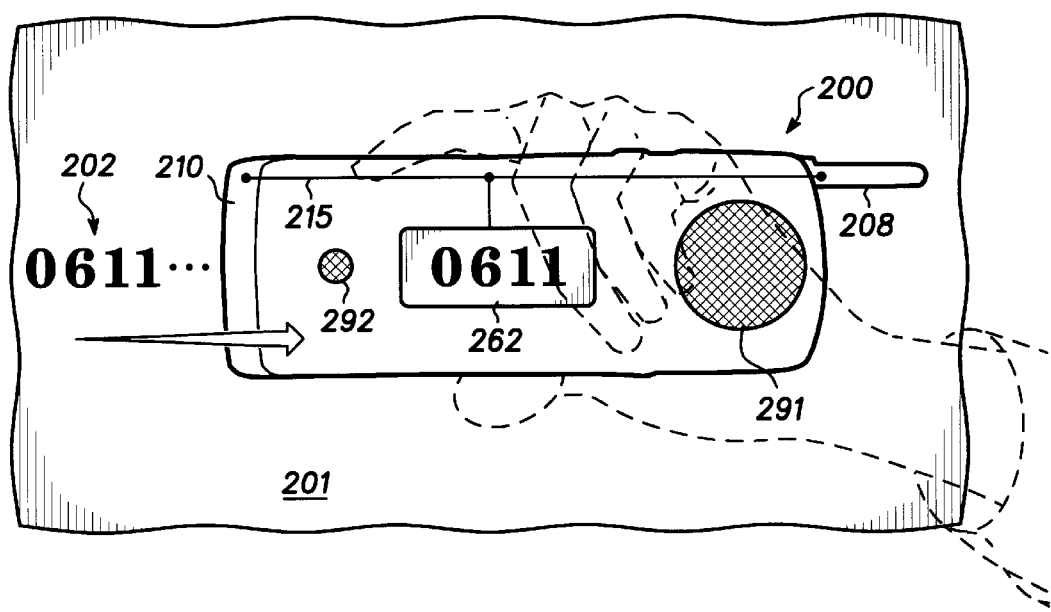
FIG. 11 illustrates a portable phone in an embodiment of the communication device.

FIG. 11 illustrates portable phone 200 in a preferred embodiment of communication device 100 according to the present invention. Preferably, portable phone 200 is a cellular mobile phone or a cord less phone (mentioned above). As illustrated, portable phone 200 has loudspeaker 291, microphone 292, display 262 (optional) and dial unit 208 for communication with a base station (e.g., station 141 in FIG. 2). For simplicity, unit 208 is symbolized only by an antenna. As in most phones, phone 200 has an input device for dialing a phone number which forwards a coded dial signal 215 to dial unit 208. According to the present invention, the input device is implemented as scanner 210 (details in FIGS. 1–10) with a character recognition function to convert a written dial identifier 202 (cf. 102, phone number) on paper 201 (cf. original 101) to coded dial signal 215. FIG. 11 indicates that the user sweeps phone 200 over paper 201 by the hand in arrow direction (reverse direction also possible).

Preferably, scanner 210 is limited to recognize numbers. Optionally, scanner 210 converts alphanumeric representations (e.g., names, internet addresses) of dial identifier 202 to phone numbers by using a look-up table (not illustrated). When required, for example, to recognize hand-writing, scanner 210 sends graphical representations of input data to the base station that obtains the code dial signals (cf. external processor 140 in FIG. 2).

While the invention has been described in terms of particular structures, devices and methods, those of skill in the art will understand based on the description herein that it is not limited merely to such examples and that the full scope of the invention is properly determined by the claims that follow.

What is claimed is:

1. Communication device having a dial unit to establish communication via a communication channel, said communication device characterized by a built-in optical character recognition reader to receive a dial identification from an original, wherein said reader collects image data of said dial identification by being in a predetermined distance from said original during a predetermined data collecting time.

2. The communication device of claim 1, wherein said reader has an autofocus objective.

3. Communication device having a dial unit to establish communication via a communication channel, said communication device characterized by a built-in optical character recognition reader to receive a dial identification from an original, wherein said reader comprises a contact camera that receives said dial identification when touching said original during a predetermined data collecting time.

4. The communication device of claim 3, wherein said contact camera is implemented on an outer surface of said communication device.

5. The communication device of claim 4, wherein said contact camera is implemented on the outer surface opposite to a display.

6. The communication device of claim 3, wherein said contact camera has an active background light.

7. The communication device of claim 3, wherein said contact camera has a florescent background light that is activated before receiving said dial identification by exposing said communication device to environment light.

8. The communication device of claim 3, wherein said contact camera is implemented by a translucent material.

9. The communication device of claim 8 wherein said translucent material is also transparent.

10. The communication device of claim 9, wherein the transparent material carrying said contact camera further comprises a liquid crystal display.

* * * * *